US007127975B2

(12) United States Patent
Miyatake et al.

(10) Patent No.: US 7,127,975 B2
(45) Date of Patent: Oct. 31, 2006

(54) ROTARY CUTTER AND METHOD FOR MANUFACTURING FIBROUS PRODUCT USING THE SAME

(75) Inventors: Takashi Miyatake, Mitoyo-gun (JP); Hideaki Miyauchi, Mitoyo-gun (JP)

(73) Assignee: Uni-Charm Corporation Ehime (JP)

( * ) Notice: Subject to any disclaimer, the term of this patent is extended or adjusted under 35 U.S.C. 154(b) by 0 days.

(21) Appl. No.: 10/762,881

(22) Filed: Jan. 21, 2004

(65) Prior Publication Data

US 2004/0149095 A1 Aug. 5, 2004

(30) Foreign Application Priority Data

Jan. 27, 2003 (JP) ............................ 2003-017849

(51) Int. Cl.
*B23D 1/56* (2006.01)
*B26D 25/02* (2006.01)

(52) U.S. Cl. ............................ 83/344; 83/308; 83/346; 83/674; 83/885

(58) Field of Classification Search .................. 83/674, 83/308, 343–346, 861, 879, 880, 885, 51
See application file for complete search history.

(56) References Cited

U.S. PATENT DOCUMENTS

| | | | |
|---|---|---|---|
| 528,730 A | 11/1894 | Magoris | |
| 1,693,589 A | 12/1928 | Bolton | |
| 2,221,716 A | 11/1940 | Morton | |
| 2,493,968 A | 1/1950 | Hepner | |
| 2,522,691 A | 9/1950 | Podolak | |
| 2,682,306 A | 6/1954 | Schriber | |
| 2,808,884 A | 10/1957 | Shann et al. | |
| 3,020,809 A * | 2/1962 | Guyer et al. | 493/354 |
| 3,086,416 A | 4/1963 | Minarik | |
| 3,472,228 A | 10/1969 | Tanner, Jr. | |
| 3,505,155 A | 4/1970 | Balch et al. | |
| 3,522,762 A | 8/1970 | Sauer | |
| 3,640,279 A | 2/1972 | Brown et al. | |
| 3,822,435 A | 7/1974 | Moss | |
| 4,018,646 A | 4/1977 | Ruffo et al. | |
| 4,041,203 A | 8/1977 | Brock et al. | |
| 4,145,787 A | 3/1979 | Bastian | |
| 4,196,245 A | 4/1980 | Kitson et al. | |
| 4,276,797 A | 7/1981 | Baumann et al. | |
| 4,279,369 A * | 7/1981 | Passafiume | 225/3 |
| 4,436,780 A | 3/1984 | Hotchkiss et al. | |

(Continued)

FOREIGN PATENT DOCUMENTS

DE 19755596 A1 2/1999

(Continued)

OTHER PUBLICATIONS

Australian Search Report of Australian Application No. 9901083-7 dated Mar. 19, 1998.

(Continued)

*Primary Examiner*—Kenneth E. Peterson
*Assistant Examiner*—Isaac N. Hamilton
(74) *Attorney, Agent, or Firm*—Darby & Darby

(57) ABSTRACT

Disclosed is a rotary cutter including a first roll and a second roll. With contact peripheries of the first roll being pressed against contact peripheries of the second roll, the first roll and the second roll are driven to rotate in synchronism with each other so that a first cutting blade is opposed to a second abutment at a distance apart and a second cutting blade is opposed to a first abutment at a distance apart. When fed between the first roll and the second roll, a workpiece is cut only halfway through the thickness from both sides thereof.

4 Claims, 5 Drawing Sheets

U.S. PATENT DOCUMENTS

| | | | | |
|---|---|---|---|---|
| 4,842,794 | A | 6/1989 | Hovis | |
| 4,893,534 | A * | 1/1990 | Kobler | 83/107 |
| 4,961,242 | A | 10/1990 | Kresse et al. | |
| 4,991,362 | A | 2/1991 | Heyer et al. | |
| 5,229,191 | A | 7/1993 | Austin | |
| 5,315,734 | A | 5/1994 | Kresse et al. | |
| 5,351,397 | A | 10/1994 | Angelie | |
| 5,368,913 | A | 11/1994 | Ortega | |
| 5,388,490 | A * | 2/1995 | Buck | 83/880 |
| 5,429,854 | A | 7/1995 | Currie et al. | |
| 5,451,288 | A * | 9/1995 | Smith et al. | 156/359 |
| 5,525,397 | A | 6/1996 | Shizuno et al. | |
| 5,964,742 | A | 10/1999 | McCormack et al. | |
| 6,085,626 | A * | 7/2000 | Pfaff, Jr. | 83/698.51 |
| 6,370,998 | B1 * | 4/2002 | Yokoro et al. | 83/698.11 |

FOREIGN PATENT DOCUMENTS

| | | | |
|---|---|---|---|
| EP | 2262121 | | 7/1974 |
| EP | 0262817 | | 4/1988 |
| EP | 0289198 | A1 | 11/1988 |
| EP | 0301599 | A1 | 2/1989 |
| EP | 05192284-B1 | A3 | 8/1993 |
| EP | 05245090 | A1 | 9/1993 |
| EP | 0596532 | A1 | 5/1994 |
| EP | 0774229 | A2 | 5/1997 |
| EP | 0777997 | A2 | 6/1997 |
| EP | 0777997 | A3 | 1/1998 |
| EP | 0774229 A3 | A1 | 4/1998 |
| EP | 0923902 | A1 | 6/1999 |
| JP | 5-192284 | | 8/1993 |
| JP | 5-245090 | | 9/1993 |
| JP | 09135798 | | 5/1997 |
| JP | 9-149873 | | 6/1997 |
| JP | 10-076494 | A1 | 3/1998 |
| WO | WO-92/03083 | A1 | 3/1992 |

OTHER PUBLICATIONS

European Search Report of European Application No. EP 98 31 0250 dated Sep. 6, 1999.

* cited by examiner

ROTARY CUTTER AND METHOD FOR MANUFACTURING FIBROUS PRODUCT USING THE SAME

This application claims priority under 35 U.S.C. § 119 based on Japanese Patent Application No. 2003-17849, filed Jan. 27, 2003. The content of the application is incorporated herein by reference in its entirety.

BACKGROUND OF THE INVENTION

1. Field of the Invention

The present invention relates to a rotary cutter which comprises two rolls for holding a workpiece such as fibrous sheet therebetween so as to make cuts in the workpiece only halfway through its thickness from both sides thereof, and also relates to a method for manufacturing a fibrous product using the rotary cutter.

2. Description of the Related Art

Rotary cutters comprising two rolls have been widely used for making a desired pattern of cuts in fibrous products such as a nonwoven fabric, a stack of nonwoven fabrics, a stack of a nonwoven fabric and a fiber bundle layer, etc.

FIG. 9 is a perspective view showing a conventional rotary cutter 1 of this kind.

The rotary cutter 1 comprises a die roll 2 and an anvil roll 3 with their axes arranged parallel with each other. The die roll 2 includes a rotary shaft 4, a periphery 5 formed with a desired radius about the roll axis of the rotary shaft 4, and a plurality of cutting blades 6 projecting radially from the periphery 5. The die roll 2 is provided at its axially opposite ends with contact peripheries 7 and 7, which are formed with a radius slightly larger than the radius of the periphery 5. The cutting blades 6 projects lightly beyond the peripheries 7 and 7 to have their edges located radially outside the peripheries 7 and 7. On the other hand, the anvil roll 3 includes a rotary shaft 8 and a periphery 9 formed with a desired radius about the roll axis of the rotary shaft 8.

In this construction, the distance between the roll axis of the die roll 2 and the roll axis of the anvil roll 3 can be kept constant with the contact peripheries 7 and 7 kept in contact with the periphery 9 of the anvil roll 3. In addition, the cutting blades 6 provided on the die roll 2 can be pressed with desired force against the periphery 9 of the anvil roll 3 by pressing the contact peripheries 7 and 7 against the periphery 9 of the anvil roll 3 with desired force.

When the die roll 2 and the anvil roll 3 are driven to rotate in the directions of the arrows in synchronism with each other and a workpiece W is fed between the die roll 2 and the anvil roll 3, the workpiece W is locally cut by the cutting blades 6 with the workpiece W held between the edges of the cutting blades 6 of the die roll 2 and the periphery 9 of the anvil roll 3.

For example, the workpiece W comprises a substrate sheet $W_a$, such as nonwoven fabric and fiber bundle layers $W_b$ disposed on two sides of the substrate sheet $W_a$. The fiber bundle layer $W_b$ is a bundle of fibers which individually extend continuously in a feed direction of the workpiece W. In other words, the individual fibers constituting the fiber bundle layer $W_b$ extend in MD without interruption, before cutting with the cutter roller 1. The fiber bundle layers $W_b$ are bonded to the substrate sheet $W_a$ at bond lines $W_c$ which are arranged at regular intervals in the feed direction (MD). When fed between the die roll 2 and the anvil roll 3, the workpiece W is held between the cutting blades 6 and the periphery 9 at positions between adjacent bond lines $W_c$, whereby the substrate sheet $W_a$ is cut together with the fiber bundle layers $W_b$, forming cut lines $W_d$.

Thus, the fiber bundle layers $W_b$ on two sides of the substrate sheet $W_a$ are individually cut into separate portions each of which is fixed to the substrate sheet $W_a$ at one bond line $W_c$ so as to have ends obtained by formation of the cut lines $W_d$ function as free ends. The resulting workpiece W can be used as a cleaning article for wiping the floor and the like, wherein the fiber bundle layers $W_b$ are expected to have an effect of collecting dust like a brush.

In the rotary cutter 1 shown in FIG. 9, however, since the cutting blades 6 project radially beyond the contact peripheries 7 and 7 to have the edges strongly pressed against the periphery 9 of the anvil roll 3 so that the substrate sheet $W_a$ can be cut together with the fiber bundle layers $W_b$, the edges of the cutting blades 6 tend to generate heat due to high pressure between the cutting blades 6 and the periphery 9. Therefore, if the fiber bundle layers $W_b$ are formed of thermoplastic resin fibers, the fibers constituting the fiber bundle layers $W_b$ may be thermally fusion-bonded to each other or to the substrate sheet $W_a$ along the cut lines $W_d$.

This results in that the individual fibers constituting the fiber bundle layers $W_b$ are hardly separated from each other in the workpiece W having passed through the cutting process, so that when used as a cleaning article, for example, the fiber bundle layers $W_b$ cannot take on a suitable brush-like form, whereby an expected duct collecting effect cannot be obtained.

In order to prevent the individual fibers constituting the fiber bundle layers $W_b$ from being thermally fusion-bonded to each other along the cut lines $W_d$, accordingly, the workpiece W may be cut by adopting a so-called half-cut technique in which a workpiece is cut from one side only halfway through its thickness, instead of cutting the substrate sheet $W_a$ and the fiber bundle layers $W_b$ all together under high pressure. In this case, since the cutting force acts on only one of the fiber bundle layers $W_b$, thermal fusion-bonding between individual fibers can be eliminated or suppressed.

Japanese Unexamined Patent Publication No. 10-76494 discloses such a half-cut technique. In the technique disclosed in the above-identified Patent Publication, the edges of the cutting blades 6 of the rotary cutter shown in FIG. 9 are formed with a radius smaller than the radius of the contact peripheries 7 and 7 so that the blade edges do not come into contact with the periphery 9. When the workpiece W is fed between the die roll 2 and the anvil roll 3, accordingly, the cutting blades 6 penetrate halfway through the thickness of the workpiece W.

However, if the half-cut technique disclosed in the above-identified Patent Publication is adopted to cut the workpiece W shown in FIG. 9, the two fiber bundle layers $W_b$ disposed on two sides of the substrate sheet $W_a$ cannot be cut at once.

SUMMARY OF THE INVENTION

The present invention has been worked out in view of the shortcomings in the prior art set forth above. It is therefore an object of the present invention to provide a rotary cutter, in which cutting of a workpiece halfway through the thickness from both sides thereof can be done at once, and a method for manufacturing a fibrous product using the rotary cutter.

According to a first aspect of the present invention, there is provided a rotary cutter comprising a first roll rotatable about a first roll axis and a second roll rotatable about a second roll axis which is parallel to the first roll axis, the rotary cutter further comprising:

a first cutting blade and a first abutment which are provided on a periphery of a roll body of the first roll and a second cutting blade and a second abutment which are provided on a periphery of a roll body of the second roll;

synchronizing means for synchronizing rotations between the first roll and the second roll so that the first cutting blade is opposed to the second abutment and the first abutment is opposed to the second cutting blade; and distance setting means for setting a distance between the first cutting blade and the second abutment and between the first abutment and the second cutting blade.

In the rotary cutter according to the first aspect of the present invention, the first roll and the second roll are driven to rotate in synchronism with each other so that the first cutting blade can be opposed to the second abutment at a distance apart and the first abutment can be opposed to the second cutting blade at a distance apart. When a workpiece is fed between the first roll and the second roll, the first cutting blade can penetrate only halfway through the workpiece from one side thereof and at the same time, the second cutting blade can penetrate only halfway through the workpiece from the other side thereof.

The rotary cutter according to the first aspect of the present invention may be constructed such that a first rib is provided to project radially from the periphery of the roll body of the first roll and the first cutting blade and the first abutment are formed in the first rib, and a second rib is provided to project radially from the periphery of the roll body of the second roll and the second cutting blade and the second abutment are formed in the second rib.

With the ribs each having one cutting blade and one abutment being provided on both the first roll and the second roll so as to be opposed to each other, a cut formed in one side of a workpiece having passed between the rolls can be located adjacent a cut formed in the other side of the workpiece. Accordingly, a completed product looks as if the two sides of the workpiece were cut at vertically opposed positions.

Preferably, the first and second abutments have a larger width than the edges of the first and second cutting blades.

With the width of the abutments being larger than that of the edges of the cutting blades, the abutments can serve as anvils, so that when the workpiece is held between the cutting blades and the abutments, the cutting blades easily penetrate halfway through the workpiece.

The rotary cutter according to the first aspect of the present invention may also be constructed such that the distance setting means includes a first contact periphery which is formed on the first roll with a radius larger than the periphery of the roll body of the first roll and a second contact periphery which is formed on the second roll with a radius larger than the periphery of the roll body of the second roll, wherein a distance between the first roll axis and the second roll axis is set by contact between the first contact periphery and the second contact periphery.

With the first contact periphery and the second contact periphery being kept in contact with each other, the distance between the first roll axis and the second roll axis can be optimally set.

According to a second aspect of the present invention, there is provided a method for manufacturing a fibrous product comprising:

rotating a first roll having a first cutting blade and a first abutment and a second roll having a second cutting blade and a second abutment in synchronism with each other so that the first cutting blade is opposed to the second abutment and the first abutment is opposed to the second cutting blade, the first roll and the second roll being installed in parallel with each other to have roll axes a distance apart from each other; and feeding a fibrous product between the first roll and the second roll so that the fibrous product is cut only halfway through the thickness from one side thereof with the fibrous product held between the first cutting blade and the second abutment and the fibrous product is also cut only halfway through the thickness from the other side thereof with the fibrous product held between the first abutment and the second cutting blade.

In this method, for example, the fibrous product includes a substrate sheet and two fiber bundle layers disposed on and locally bonded to two sides of the substrate sheet, respectively, wherein one of the fiber bundle layers is cut by the first cutting blade and the other is cut by the second cutting blade. The fibrous product may be a cleaning article in which the fiber bundle layers thus cut have an effect of collecting dust.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
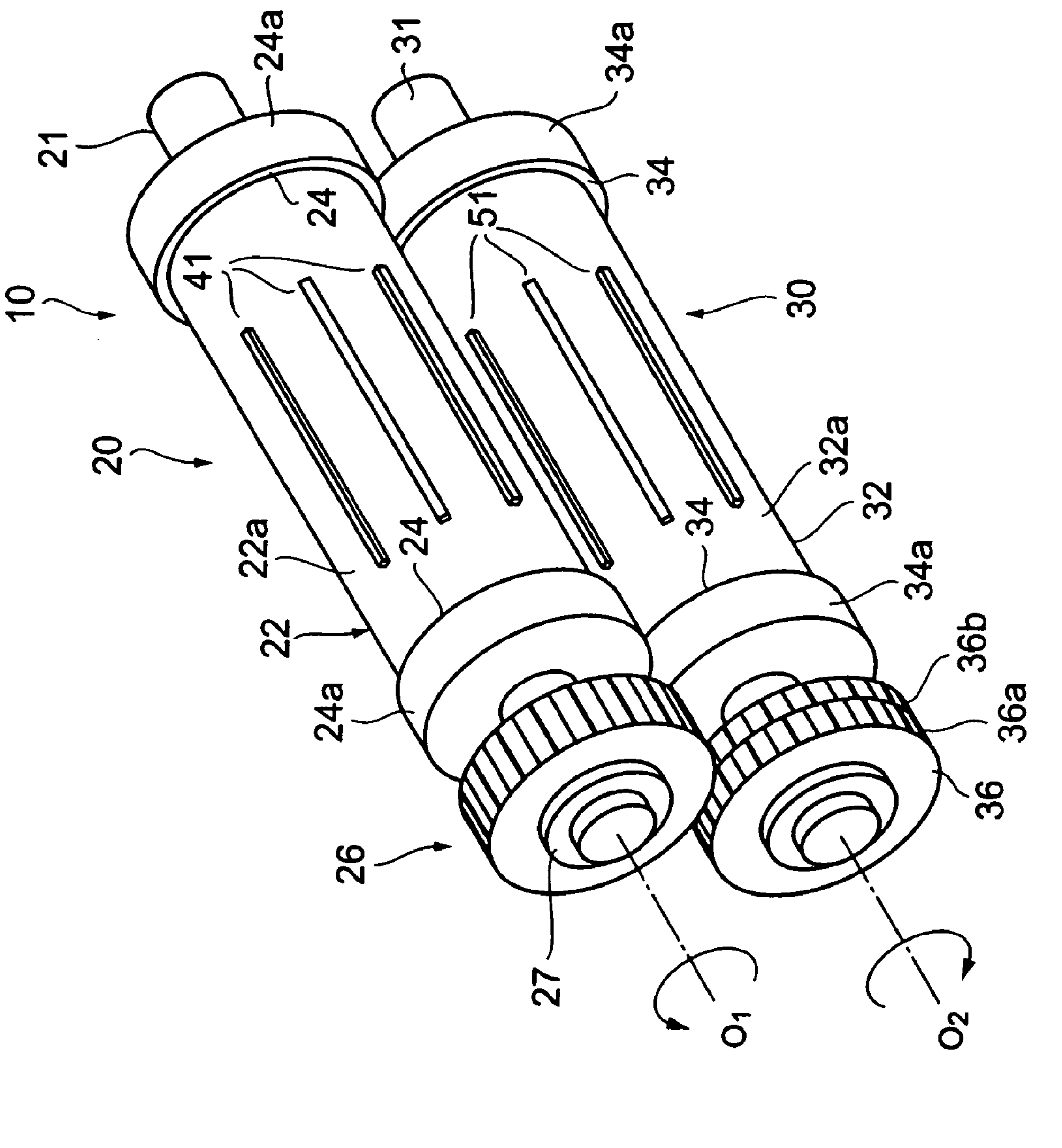
FIG. 1 is a perspective view showing a rotary cutter according to one embodiment of the present invention.
Figure 2:
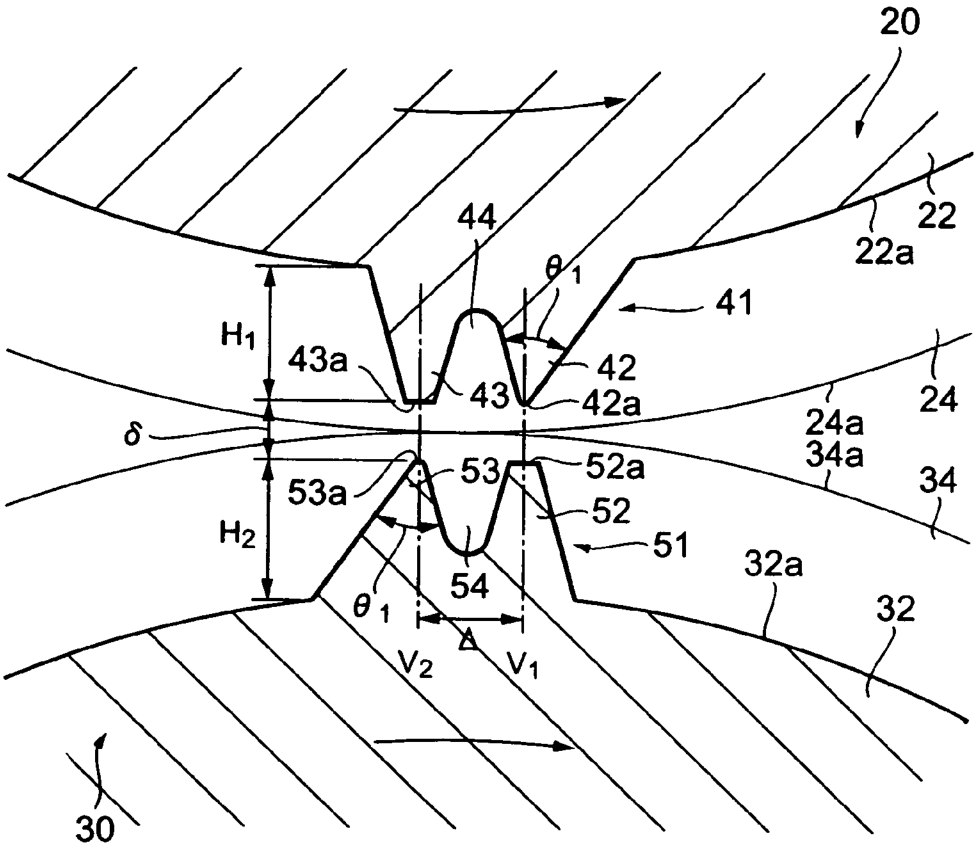
FIG. 2 is an enlarged sectional view taken along a plane perpendicular to roll axes, showing how cutting blades are opposed to abutments in the rotary cutter of FIG. 1.
Figure 3:
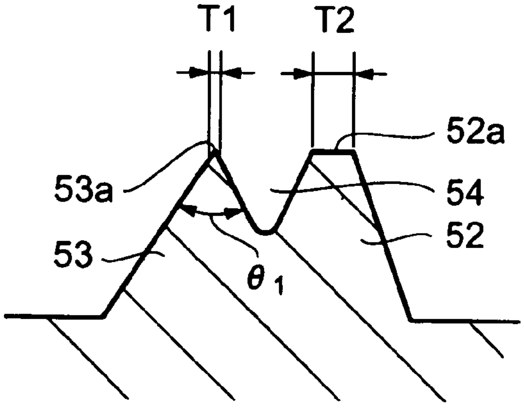
FIG. 3 is an enlarged sectional view showing the cutting blade and the abutment provided on one roll.
Figure 4:
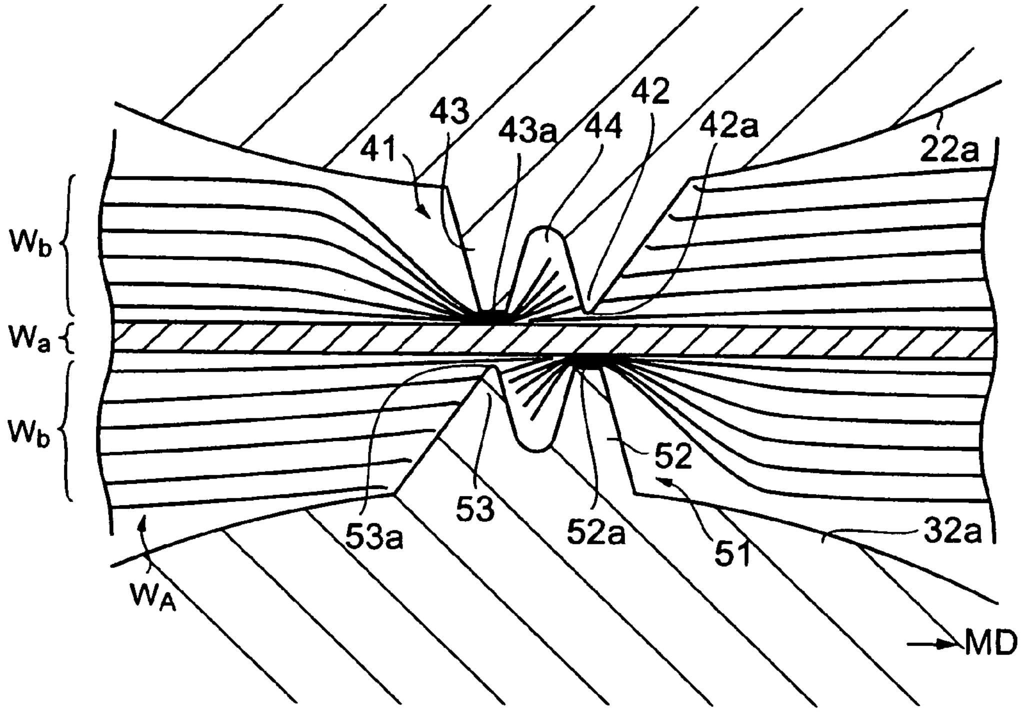
FIG. 4 is an enlarged sectional view showing a process of cutting a workpiece between the cutting blades and the abutments.
Figure 5:
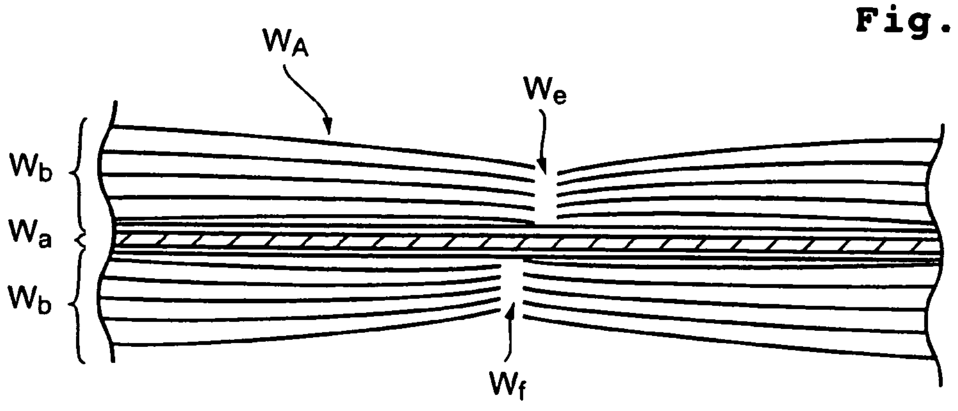
FIG. 5 is an enlarged sectional view showing the workpiece formed with cuts.

FIG. 1 is a perspective view showing a rotary cutter according to one embodiment of the present invention; FIG. 2 is an enlarged sectional view taken along a plane perpendicular to roll axes, showing how cutting blades are opposed to abutments in the rotary cutter of FIG. 1; FIG. 3 is an enlarged sectional view showing the cutting blade and the abutment provided on one roll; FIG. 4 is an enlarged sectional view showing a process of cutting a workpiece between the cutting blades and the abutments; and FIG. 5 is an enlarged sectional view showing the workpiece formed with cuts.

FIG. 1 shows a rotary cutter 10 comprising a first roll 20 and a second roll 30. Both the rolls 20 and 30 are made of a steel material such as die steel.

The first roll 20 has a rotary shaft 21 and a roll body 22 secured to the rotary shaft 21. The rotary shaft 21 has an axis that is referred to as first roll axis $O_1$. The roll body 22 has a periphery 22*a* that is a cylindrical surface formed with a radius about the first roll axis $O_1$. On the periphery 22*a* of the roll body 22, there are disposed several first ribs 41. The individual first ribs 41 project radially from and extend axially on the periphery 22*a* so that adjacent first ribs 41 are parallel to each other.

Axially opposite side rings 24 and 24 are formed integral with the first roll 20 to have the first ribs 41 located therebetween. The side rings 24 and 24 have peripheries that are referred to as first contact peripheries 24*a* and 24*a*. The first contact peripheries 24*a* and 24*a* have a larger radius than the periphery 22*a* .

The second roll 30 has a rotary shaft 31, whose axis is referred to as second roll axis $O_2$. The second roll 30 has a roll body 32, whose periphery 32*a* is a cylindrical surface formed with a radius about the second roll axis $O_2$. The radius of the periphery 32*a* of the second roll 30 is identical to the radius of the periphery 22*a* of the first roll 20. Several second ribs 51 are disposed on the periphery 32*a* to project radially there from. The individual second ribs 51 extend axially so that adjacent second ribs 51 are parallel to each other.

Axially opposite side rings 34 and 34 are formed integral with the second roll 30 to have the second ribs 51 located therebetween. The side rings 34 and 34 have peripheries that are referred to as second contact peripheries 34*a* and 34*a*. The second contact peripheries 34*a* and 34*a* have a larger radius than the periphery 32*a* about the second roll axis $O_2$. The radius of the second contact peripheries 34*a* and 34*a* is identical to the radius of the first contact peripheries 24*a* and 24*a* of the first roll 20.

The first contact peripheries 24*a* and 24*a* are pressed against the second contact peripheries 34*a* and 34*a* with a force applied to the first roll 20 and the second roll 30 so that the roll axes $O_1$ and $O_2$ approach each other, which results in keeping the first roll axis $O_1$ and the second roll axis $O_2$ in parallel with each other and at a constant distance apart from each other. Thus, the first contact peripheries 24*a* and 24*a* of the first roll 20 and the second contact peripheries 34*a* and 34*a* of the second roll 30 constitute distance setting means.

A synchronous gear 26 is secured to the rotary shaft 21 of the first roll 20, while a synchronous gear 36 is provided on the rotary shaft 31 of the second roll 30. The synchronous gears 26 and 36 are of the same pitch circle and in meshing engagement with each other. The synchronous gear 36 is composed of two spur gears 36*a* and 36*b*, wherein one spur gear 36*a* is secured to the rotary shaft 31 while the other spur gear 36*b* is biased circumferentially by means of spring. With the two spur gears 36*a* and 36*b* being circumferentially repelled from each other by means of spring and meshing with the synchronous gear 26, the backlash between the synchronous gears 26 and 36 is eliminated.

Between the rotary shaft 21 of the first roll 20 and the synchronous gear 26, a phase adjusting mechanism 27 is further provided. With this phase adjusting mechanism 27, the phase of the rotary shaft 21, which is secured to the roll body 22, in the rotational direction can be adjusted with respect to the phase of the synchronous gear 26 in the rotational direction, and the rotary shaft 21 can be locked to the synchronous gear 26 in the adjusted position. By adjusting the phases between the synchronous gear 26 and the roll body 22 in a state where the synchronous gears 26 and 36 are in meshing engagement with each other, each first rib 41 and its corresponding second rib 51 can be certainly opposed to each other in a plane containing the first and second roll axes $O_1$ and $O_2$, as the first and second rolls 20 and 30 are driven to rotate.

To this end, the first ribs 41 and the second ribs 51 are circumferentially arranged at the same pitch on the first roll 20 and the second roll 30, respectively. The first ribs 41 and the second ribs 51 are of the same length in the axial direction.

As shown in FIG. 2, each first rib 41 has a first cutting blade 42 positioned forward in the rotational direction and a first abutment 43 positioned rearward in the rotational direction. The first cutting blade 42 has a blade edge 42*a* extending in the axial direction of the first roll 20. On the other hand, the first abutment 43 is formed at its top with a receiving surface 43*a* extending in the axial direction of the first roll 20. The receiving surface 43*a* is a flat surface or a surface curved with center at the roll axis $O_1$. Between the first cutting blade 42 and the first abutment 43, furthermore, a first groove 44 is formed to extend in the axial direction.

As shown in the sectional view of FIG. 2, the first rib 41 and the second rib 51 are symmetrical about a point (rotationally symmetrical), wherein each second rib 51 has a second abutment 52 positioned forward in the rotational direction and a second cutting blade 53 positioned rearward in the rotational direction. The second abutment 52 is formed at its top with a flat or curved receiving surface 52*a* extending in the axial direction, while the second cutting blade 53 is formed at its top with a blade edge 53*a* extending in the axial direction. Between the second abutment 52 and the second cutting blade 53, furthermore, a second groove 54 is formed to extend in the axial direction.

In the first roll 20, both the blade edge 42*a* of the first cutting blade 42 and the receiving surface 43*a* of the first abutment 43 are located closer to the roll axis $O_1$ than the first contact peripheries 24*a*. Also in the second roll 30, both the receiving surface 52*a* of the second abutment 52 and the blade edge 53*a* of the second cutting blade 53 are located closer to the roll axis $O_2$ than the second contact peripheries 34*a*.

A projecting dimension H1 of the blade edge 42*a* and the receiving surface 43*a* as measured radially from the periphery 22*a* is equal to a projecting dimension H2 of the blade edge 53*a* and the receiving surface 52*a* as measured radially from the periphery 32*a*. A distance $\delta$ between the blade edge 42*a* of the first cutting blade 42 and the receiving surface 52*a* of the second abutment 52 and between the receiving surface 43*a* of the first abutment 43 and the blade edge 53*a* of the second cutting blade 53 is from 0.01 to 0.03 mm.

As the first roll 20 and the second roll 30 are driven to rotate in synchronism with each other, each first rib 41 is momentarily opposed to its corresponding second rib 51 as shown in FIG. 2. At that moment, the center (axially extending centerline) of the blade edge 42*a* of the first cutting blade 42 and the center (axially extending centerline) of the receiving surface 52*a* of the second abutment 52 are in one plane $V_1$, while the center of the receiving surface 43a of the first abutment 43 and the center of the blade edge 53a of the second cutting blade 53 are in another plane $V_2$. These planes $V_1$, and $V_2$ are parallel to each other with a distance Δ of 1 to 2 mm.

The first cutting blade 42 and the second cutting blade 53 are of the same sectional shape and of an included angle θ 1 to have an increasing width from the blade edge 42a/53a toward the bottom. The included angle θ 1 is about 20 to 70 degrees. On the other hand, the blade edge 42a of the first cutting blade 42 and the blade edge 53a of the second cutting blade 53 are of a width $T_1$ in the range of 0.01 to 0.06 mm. The receiving surface 43a of the first abutment 43 and the receiving surface 52a of the second abutment 52 are of a width $T_2$ which is larger than the width $T_1$ of the blade edge and in the range of 0.08 to 1.0 mm.

Figure 6:
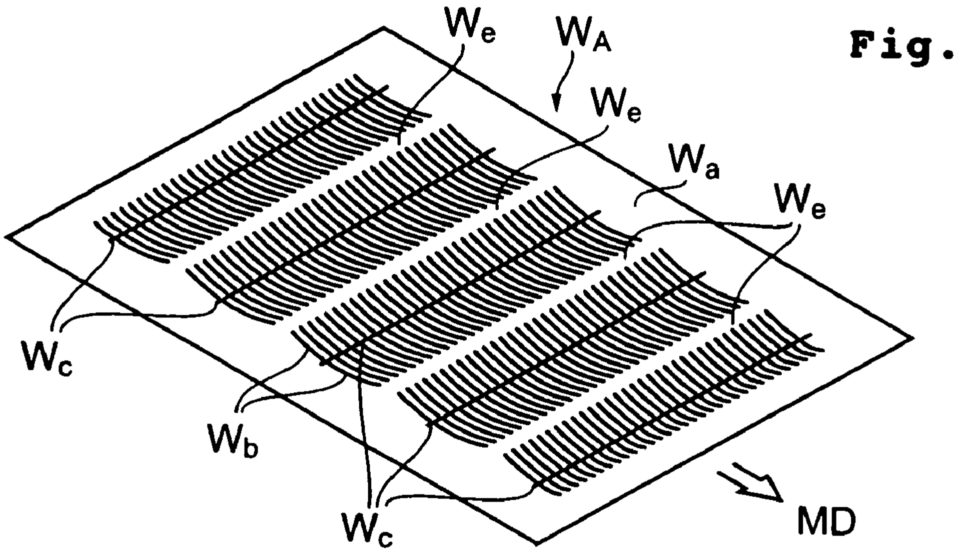
FIG. 6 is a perspective view showing the workpiece after the cutting process.

FIG. 4 is a sectional view showing a process of cutting a workpiece $W_A$ with the rotary cutter 10; FIG. 5 is a sectional view showing the workpiece $W_A$ formed with cuts; and FIG. 6 is a perspective view showing the workpiece $W_A$ after the cutting process.

The workpiece $W_A$ is a fibrous product, in which fiber bundle layers $W_b$, $W_b$ are disposed on two sides of a substrate sheet $W_a$ . Prior to the cutting process with the rotary cutter 10, the fiber bundle layers $W_b$, $W_b$ are bonded to the substrate sheet $W_a$ at bond lines $W_c$ which are arranged at regular intervals in the feed direction (MD) of the workpiece $W_A$ to extend linearly in a direction (CD) perpendicular to MD.

The substrate sheet $W_a$ is nonwoven fabric comprising thermoplastic fibers, such as spunbonded, meltblown or spunlaced nonwoven fabric. On the other hand, the fiber bundle layer $W_b$ is a bundle of fibers which are unbonded to each other unless otherwise noted. For example, the fiber bundle layer $W_b$ may be a fiber bundle obtained by opening tow, wherein individual fibers extend continuously in MD. The fibers constituting the fiber bundle layer $W_b$ may be sheath/core bicomponent fibers of which the sheath is a low-melting resin such as polyethylene (PE) and the core is polyethylene terephthalate (PET) or polypropylene (PP).

Since both the substrate sheet $W_a$ and the fiber bundle layers $W_b$ contain thermoplastic fibers, the bond lines $W_c$ can be formed by thermal fusion-bonding of the fibers constituting the substrate sheet $W_a$ and the fibers constituting the fiber bundle layers $W_b$.

When the workpiece $W_A$ is fed between the first roll 20 and the second roll 30 that are rotating in synchronism with each other, the workpiece $W_A$ is held between the first rib 41 and the second rib 51 at a position between adjacent bond lines $W_c$.

As shown in FIG. 4, the first cutting blade 42 is pressed against the upper side of the workpiece $W_A$ with the lower side received by the receiving surface 52a of the second abutment 52. Since the width $T_2$ of the receiving surface 52a is sufficiently large and the blade edge 42a is pressed against a portion of the workpiece $W_A$ supported by the receiving surface 52a, the workpiece $W_A$ is cut halfway through its thickness from the upper side. Thus, the fiber bundle layer $W_b$ disposed on the upper side of the substrate sheet $W_a$ is formed with a cut $W_e$.

Immediately after the formation of the cut $W_e$, furthermore, the workpiece $W_A$ is cut from the lower side with the blade edge 53a of the second cutting blade 53 while the upper side is supported by the receiving surface 43a of the first abutment 43. Thus, the fiber bundle layer $W_b$ disposed on the lower side of the substrate sheet $W_a$ is formed with a cut $W_f$.

Figure 8:
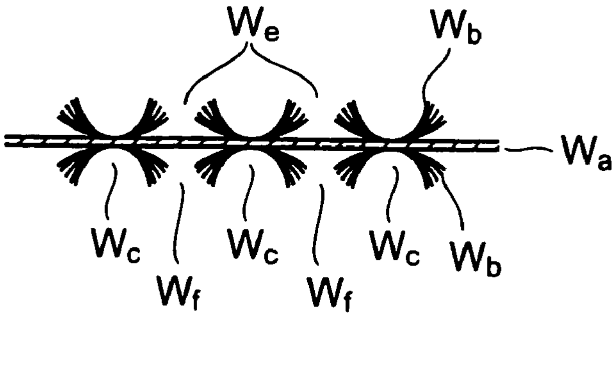
FIG. 8 is a sectional view showing the workpiece after the cutting process.
Figure 9:
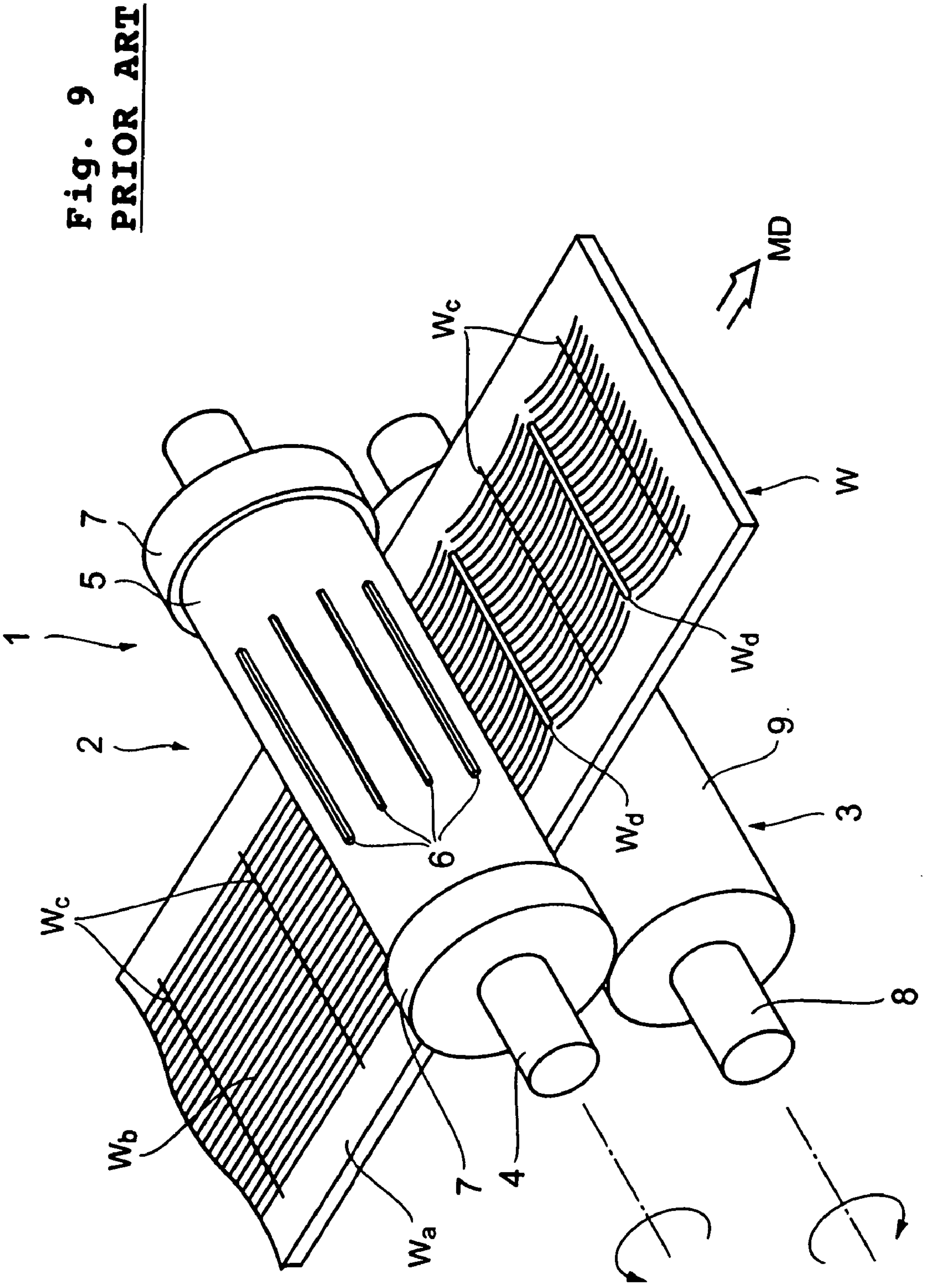
Fig. 9 PRIOR ART
FIG. 9 is a perspective view showing a process of cutting a fibrous product with a conventional rotary cutter.

FIG. 6 shows the workpiece $W_A$ after the cutting process, wherein several cuts $W_e$ are formed at positions between adjacent bond lines $W_c$ in the fiber bundle layer $W_b$ disposed on the upper side of the substrate sheet $W_a$. Although not shown in FIG. 6, several cuts $W_f$ are also formed at positions between adjacent bond lines $W_c$ in the fiber bundle layer $W_b$ disposed on the lower side of the substrate sheet $W_a$. It should be noted that the cuts $W_e$ and $W_f$ are formed without cutting the substrate sheet $W_a$. Since the fiber bundle layers $W_b$ are not cut together with the substrate sheet $W_a$ but cut only halfway unlike the conventional ones, thermal fusion-bonding of the fibers constituting the fiber bundle layers $W_b$ hardly occurs at the cuts $W_e$, $W_f$. In the fiber bundle layers $W_b$, $W_b$ thus cut into separate portions each of which is fixed to the substrate sheet $W_a$ at one bond line $W_c$ to have ends obtained by formation of the cuts $W_e$, $W_f$ function as free ends, therefore, the individual fibers are allowed to easily separate from each other at the free ends, as shown in FIG. 8, so that the fiber bundle layers $W_b$, $W_b$ have an effect of collecting dust like a brush.

Accordingly, the fibrous product is suitable for use as a cleaning article for wiping the floor and the like.

In the fibrous product, furthermore, since each cut $W_e$ formed in the fiber bundle layer $W_b$ disposed on the upper side of the substrate sheet $W_a$ is very close to its corresponding cut $W_f$ formed in the fiber bundle layer $W_b$ disposed on the lower side of the substrate sheet $W_a$, these cuts $W_e$ and $W_f$ look as if they were formed at the same position on the upper and lower sides. Accordingly, the fibrous product looks like having identical brush portions on both the upper and lower sides thereof.

It should be noted that although both the first ribs 41 provided on the first roll 20 and the second ribs 51 provided on the second roll 30 extend axially continuously in the embodiment shown in FIG. 1, it is also possible that the first ribs 41, the second ribs 51, or all the first ribs 41 and the second ribs 51 are formed to extend axially intermittently.

Figure 7:
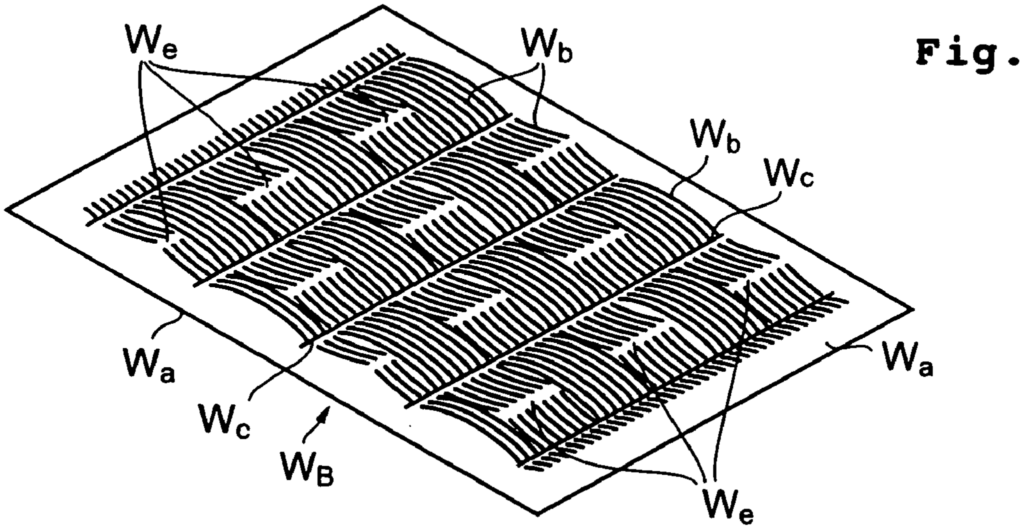
FIG. 7 is a perspective view showing another workpiece after the cutting process.

FIG. 7 shows a workpiece $W_B$ that is processed with a rotary cutter having such intermittently extending ribs, wherein the fiber bundle layer $W_b$ disposed on the upper side is intermittently cut between adjacent bond lines $W_c$, and although not shown in FIG. 7, the fiber bundle layer $W_b$ disposed on the lower side is similarly cut.

The workpieces $W_A$ and $W_B$ may have nonwoven fabric layers in place of the fiber bundle layers $W_b$, $W_b$ and these nonwoven fabric layers may be cut with a rotary cutter according to the present invention.

According to the present invention, as has been described hereinabove, cutting of a workpiece halfway through the thickness from both sides thereof can be done at once. Therefore, the rotary cutter according to the present invention is suitable for manufacturing a fibrous product having brush portions of fiber bundle layers on both sides thereof, for example. Furthermore, since thermal fusion-bonding of fibers at cuts is eliminated, a fibrous product having a dust collecting effect due to fluffing can be certainly obtained.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A rotary cutter comprising:

a first roll rotatable about a first roll axis; and a second roll rotatable about a second roll axis which is parallel to the first roll axis;

a first cutting blade and a first abutment which are provided on a periphery of the first roll and a second cutting blade and a second abutment which are provided on a periphery of the second roll;

synchronizing means for synchronizing each rotation of the first roll and the second roll so that when the first roll and the second roll rotate in synchrony the first cutting blade of the first roll opposes the second abutment of the second roll and the first abutment of the first roll opposes the second cutting blade of the second roll; and distance setting means for setting a distance between the first cutting blade and the second abutment and between the first abutment and the second cutting blade, wherein the first roll and the second roll rotate in synchrony to receive a fibrous product, and the first cutting blade and the second abutment are configured to hold and cut the fibrous product partway through the thickness from one side thereof and the first abutment and the second cutting blade are configured to hold and cut the fibrous product partway through the thickness from the other side thereof at a location different from the cut made by the first cutting blade and the second abutment, wherein a first rib is provided to project radially from the periphery of the first roll and the first cutting blade and the first abutment are formed in the first rib, and a second rib is provided to project radially from the periphery of the second roll and the second cutting blade and the second abutment are formed in the second rib.

2. A rotary cutter according to claim 1, wherein the first and second abutments have a larger width than the edges of the first and second cutting blades.

3. A rotary cutter according to claim 1, wherein the distance setting means includes a first contact periphery which is formed on the first roll with a radius larger than the periphery of the first roll and a second contact periphery which is formed on the second roll with a radius larger than the periphery of the second roll, wherein a distance between the first roll axis and the second roll axis is set by contact between the first contact periphery and the second contact periphery.

4. A rotary cutter comprising:

a first roll rotatable about a first roll axis, the first roll having on its surface a first cutting blade and a first abutment disposed sequentially in the circumferential direction of the first roll;

a second roll rotatable about a second roll axis which is parallel to the first roll axis, the second roll having on its surface a second cutting blade and a second abutment disposed sequentially in the circumferential direction of the second roll, said first roll and said second roll rotate in synchrony to receive a fibrous product;

synchronizing means for causing the first roll and the second roll to rotate in synchrony such that upon rotation the first cutting blade of the first roll opposes the second abutment of the second roll and the first abutment of the first roll opposes the second cutting blade of the second roll; and distance setting means for setting a distance between the first cutting blade and the second abutment and between the first abutment and the second cutting blade, wherein the first cutting blade and the second abutment are configured to hold and cut the fibrous product partway through from one side thereof, and the first abutment and the second cutting blade are configured to hold and cut the fibrous product partway through from the opposite side thereof at a location displaced from the cut made by the first cutting blade and the second abutment, wherein a first rib is provided to project radially from the periphery of the first roll and the first cutting blade and the first abutment are formed in the first rib, and a second rib is provided to project radially from the periphery of the second roll and the second cutting blade and the second abutment are formed in the second rib.

* * * * *